US006170010B1

(12) United States Patent
Hirata et al.

(10) Patent No.: US 6,170,010 B1
(45) Date of Patent: Jan. 2, 2001

(54) COMPUTER OPERATION MANAGEMENT SYSTEM

(75) Inventors: Toshiaki Hirata, Kashiwa; Akihiro Urano, Fujisawa; Shuji Fujino, Ebina; Eiji Matsumura, Yokohama, all of (JP)

(73) Assignee: Hitachi, Ltd., Tokyo (JP)

( * ) Notice: Under 35 U.S.C. 154(b), the term of this patent shall be extended for 0 days.

(21) Appl. No.: 09/188,263

(22) Filed: Nov. 9, 1998

(30) Foreign Application Priority Data

Nov. 7, 1997 (JP) .................................................... 9-306067

(51) Int. Cl.[7] .................................................. G06F 15/173
(52) U.S. Cl. ............................................ 709/223; 709/224
(58) Field of Search .................................... 709/202, 203, 709/205, 208, 223, 224, 100, 101; 714/4, 15, 57, 805; 705/8, 11; 706/47; 345/331

(56) References Cited

U.S. PATENT DOCUMENTS

| | | | | |
|---|---|---|---|---|
| 5,748,884 | * | 5/1998 | Royce et al. | 714/57 |
| 5,751,914 | * | 5/1998 | Coley et al. | 706/47 |
| 5,796,951 | * | 8/1998 | Hamner et al. | 709/223 |
| 5,826,239 | * | 11/1998 | Du et al. | 705/8 |
| 5,872,931 | * | 2/1999 | Chivaluri | 709/223 |
| 5,872,970 | * | 2/1999 | Pickett et al. | 709/101 |
| 5,893,905 | * | 4/1999 | Main et al. | 705/11 |
| 5,944,782 | * | 8/1999 | Noble et al. | 709/202 |
| 6,006,193 | * | 12/1999 | Gibson et al. | 705/8 |
| 6,023,507 | * | 2/2000 | Wookey | 714/805 X |

FOREIGN PATENT DOCUMENTS

| | | | |
|---|---|---|---|
| 0 549677 B1 | * | 9/1991 | (EP) . |
| 2 254 522 | * | 1/1992 | (GB) . |

* cited by examiner

Primary Examiner—Zarni Maung
Assistant Examiner—Patrice Windee
(74) Attorney, Agent, or Firm—Antonelli, Terry, Stout & Kraus, LLP

(57) ABSTRACT

In a computer system to which a plurality of computers are connected, a managing computer manages operations performed in the respective computers in an integrated manner, or manages the operations in relation to the computers themselves. As a result, problems occurring in the processes can be easily solved, and furthermore a load on a network is reduced. The managing computer manages a series of operations in an integrated manner in which when an operation is executed by each of the plurality of computers, or by the respective computers in combination with each other, the managing computer performs an operation designated when a specific event happens to occur on a computer. The managing computer displays each of the operations executed on the computers by a symbol; displays an execution sequence of the operations by a link with a direction among symbols; and further displays an execution condition of the computer by a color of a symbol. As a consequence, both an operation monitor screen and a computer monitor screen are mutually switched to display the switched monitor screen while setting a relationship between the computers and the operations, and the relationship between the operations and the computers are clearly represented.

8 Claims, 9 Drawing Sheets

| COMPUTER GROUP NAME | COMPUTER NAME | COMPUTER CONDITION | CPU UTILIZATION EFFICIENCY | DETAILED INFORMATION |
|---|---|---|---|---|
| GROUP A | COMPUTER A | NORMAL | 20% | |
| GROUP A | COMPUTER B | NORMAL | 50% | |
| GROUP A | COMPUTER C | ABNORMAL | 90% | |
| GROUP B | COMPUTER D | PARTIALLY ABNORMAL | 5% | |

FIG.7B

OPERATION DEFINITION TABLE  702

| OPERATION DEFINITION IDENTIFIER | COMPUTER NAME | EXECUTION CONDITION | DEFINITION SORT |
|---|---|---|---|
| 1101 | COMPUTER A | EXECUTED | POWER SUPPLY CONTROL |
| 2101 | COMPUTER A | UNDER EXECUTION | JOB NET |
| 3101 | COMPUTER A | WAIT FOR EXECUTION | PRINT |
| | | | |

FIG.7C

OPERATION DEFINITION DETAILED TABLE (POWER SUPPLY CONTROL)  703

| OPERATION DEFINITION IDENTIFIER | POWER SUPPLY INITIATION (DAY) | POWER SUPPLY INITATION (TIME) | | |
|---|---|---|---|---|
| 1101 | MONDAY TO FRIDAY | 9:00/9:00 | MONDAY TO FRIDAY | 21:00 |
| | | | | |
| | | | | |

FIG.7D

OPERATION DEFINITION DETAILED TABLE (JOB NET)  704

| OPERATION DEFINITION IDENTIFIER | JOB NET NAME | INITIATION TIME IN START | INITIATION DAY | CONFIGURATION JOB DEFINITION / STATE |
|---|---|---|---|---|
| 1101 | JOB NET A | 9:03/9:05 | MONDAY TO FRIDAY | JOB A1 / COMPLETE JOB A21/ DELAY |
| | | | | |
| | | | | |

FIG.8
EVENT/LOG TABLE 705

| EVENT/LOG IDENTIFIER | COMPUTER NAME | TIME IN START | EVENT/LOG SORT | OPERATION DEFINITION IDENTIFIER | DETAILED INFORMATION |
|---|---|---|---|---|---|
| 1001 | COMPUTER A | 6/16 9:02 | POWER SUPPLY ON | 1101 | NORMAL INITIATION |
| 2001 | COMPUTER A | 6/16 9:04 | START JOB NET A | 2101 | |
| 3001 | COMPUTER A | 6/16 9:10 | START PRINT | 3101 | PRINTER A |
| 3002 | COMPUTER A | 6/16 9:12 | END PRINT | 3101 | PRINTER A, NORMAL STATE |

FIG.9

| IMPORTANCE DEGREE | DAY | TIME | NOTIFICATION SOURCE | MESSAGE |
|---|---|---|---|---|
| Normal | 97/6/19 | 9:02:20 | COMPUTER A | POWER SUPPLY IS TURNED ON |
| Normal | 97/6/19 | 9:04:50 | COMPUTER A | JOB NET A IS STARTED |
| Normal | 97/6/19 | 9:10:30 | COMPUTER A | PRINT BY PRINTER A IS STARTED |
| Error | 97/6/19 | 9:13:30 | COMPUTER A | FAILURE OCCURS DURING PRINTING OPERATION BY PRINTER A |

EVENT/LOG TABLE 801

| EVENT/LOG IDENTIFIER | COMPUTER NAME | TIME IN START | EVENT/LOG SORT | CHECK POINT INFORMATION | OPERATION DEFINITION IDENTIFIER | DETAILED INFORMATION |
|---|---|---|---|---|---|---|
| 1001 | COMPUTER A | 6/16 9:02 | POWER SUPPLY ON | — | 1101 | NORMAL INITIATION |
| 2001 | COMPUTER A | 6/16 9:04 | START JOB NET A | — | 2101 | NORMAL INITIATION |
| 2003 | COMPUTER A | 6/16 9:04 | START JOB A-1 | — | 2101 | NORMAL INITIATION |
| 3001 | COMPUTER A | 6/16 9:10 | START PRINTING | — | 3101 | PRINTER A |
| 3002 | COMPUTER A | 6/16 9:12 | END PRINTING | — | 3101 | PRINTER A, NORMAL STATE |
| 2004 | COMPUTER A | 6/16 9:13 | END JOB A-1 | OK | 2101 | NORMAL END |
| 2003 | COMPUTER A | 6/16 9:14 | START JOB A-2 | — | 2101 | NORMAL INITIATION |
| 2004 | COMPUTER A | 6/16 9:13 | END JOB A-2 | OK | 2101 | NORMAL END |
| 2002 | COMPUTER A | 6/16 9:13 | END JOB NET A | — | 3101 | PRINTER A, NORMAL STATE |

COMPUTER OPERATION MANAGEMENT SYSTEM

BACKGROUND OF THE INVENTION

The present invention relates to a computer operation management system in which a plurality of computers are connected via a network to a managing computer for managing these computers.

Japanese periodicals "NIKKEI COMPUTER" (issued on Jan. 22, 1996, in pages 115 to 117), and "NIKKEI OPEN SYSTEM" (issued in June, 1997, No. 51, pages 234 to 239) describe the following conventional computer systems. That is, in these conventional computer systems, the functions for executing the operation processes are provided as independent programs. As the operation processes, there are the controls of turning ON/OFF the power supply, the job execution control, the print control, and the like. Also, these Japanese periodicals describe that the function for managing the conditions of the computers and the communication network is provided as a program independent from a product for controlling/monitoring the executions of the above-described operations.

U.S. Pat. No. 5,619,655 entitled "System for administration and management of network from remote or central station through an operator interface which prepare and stores the management orders for execution" and U.S. Pat. No. 5,642,508 entitled "Distributed control method and apparatus for job execution" disclose approaches for performing network management and job execution management as independent operations at remote management stations As a result, in these computer systems, with respect to each of the respective computers, or each of the operation processes executed in the respective computers, a display monitor screen used to confirm the definition of the execution schedule for this operation process, and also the display screen used to confirm the execution result of each of the operation processes are constituted. Furthermore, the screen used to confirm the conditions of the computers and the communication network is arranged as a separate screen from the above-described management screens for the operation processes.

The above-mentioned conventional computer systems are suitable only for such a case that only necessary operation functions are utilized in relatively small-scaled networks. However, if the above-mentioned conventional computer systems are applied to such a large-scale computer system, then a total operation management could not be practically realized as a computer system. That is, in this large-scale computer system, there are many possibilities that a plurality of operation processes are combined with each other when these operation processes are executed. This is because the computers and the communication networks should be furthermore and in an integrated manner managed with respect to each of the operation processes.

In addition, since the respective operation processes are independently operated and both the computers and the communication network are separately managed, it is practically difficult to solve the problem occurring in the operation processes in correspondence with the problem occurring in the computers.

However, when all of the operation management processes are carried out by the managing computer, since communications are required between the managing computer and each of the computers, network traffics must be considered.

SUMMARY OF THE INVENTION

An object of the present invention is to provide a method and a program, and furthermore, a computer or a system using the same in a computer system to which a plurality of computers are connected, in which a managing computer for managing these computers manages operations executed by the respective computers in a batch mode, and the managing computer can execute operating of the operations and managing of the computers themselves in relation to each other, and a problem occurring in the operations process can be readily solved in relation to a problem occurred in the computers themselves and in a communication network.

Another object of the present invention is to provide a method and a program capable of avoiding an excessive load on the communication network, and to provide a computer, or a system with employment of this method and program.

To achieve the above-mentioned objects, according to a first aspect of the present invention, in a computer operation management system where a plurality of computers are connected via a network to a managing computer, the managing computer comprises:

means for managing a series of operations collectively or integrally, the series of operations executing operations designated in such a case that a power supply of the respective computers, or of a computer for executing a job in combination with the respective computers is turned ON and turned OFF, a job is executed, an execution result is printed, and a specific event happens to occur;

operation monitoring means for representing the respective operations executed on the computers by symbols, for representing an execution order of the respective operations by links with directions among the symbols, and further for representing execution conditions of the respective operations by colors of the symbols;

computer monitoring means for representing a connection relationship among the computers by links among symbols, and furthermore for representing operation conditions of the computers by colors of symbols;

means for mutually switching a monitor screen displayed by the operation monitoring means and a monitor screen displayed by the computer monitoring means to display the switched monitor screen, while making a relationship between the computers and the operations executed on the computers, and also for clarifying the relationship among the operations and the computers;

means for displaying the computer symbols of the computer monitoring means in a plurality of colors in response to conditions of the computers; and means for displaying the operation symbols of the operation monitoring means in a plurality of colors in response to conditions of the operations.

Also, according to a second aspect of the present invention, in a computer operation management system where a plurality of computers are connected via a network to a managing computer, the managing computer comprises:

means for displaying thereon a message in which a change in the operation and the condition of the computer is notified as an event on the managing computer;

means for changing a display color of the message in accordance with an importance degree of the event;

means for instructing a previously designated computer to execute an action of a previously designated operation when a specific event is received;

means for referring to conditions of the respective computers managed by the computer monitoring means in the case that an operation cannot be accomplished under normal condition due to a cause of computers, or an operation program, and for instructing the computers operated under normal condition to retry the operations by returning back to a time instant when the operation can be retried;

means for regularly acquiring load conditions of the respective computers whose operations should be executed;

means for monitoring a time instant of an execution result with respect to a scheduled execution time instant of an operation; and means for interrupting the execution of operation on the computer at an execution point of a switchable operation when the execution result time instant exceeds a predesignated time range, and for instructing another computer whose load is lower than, or equal to a predetermined load to execute an operation from a next execution point.

BRIEF DESCRIPTION OF THE DRAWINGS

FIG. 7A shows a computer management table, FIG. 7B indicates an operation definition table, and FIGS. 7C and 7D represent operation definition detail tables, respectively.

FIG. 8 is an explanatory diagram for explaining an example of structures of various tables contained on a database.

FIG. 9 is an explanatory diagram for indicating an example of event information displayed by the managing computer.

FIG. 10 schematically indicates a structure of an event log table.

DESCRIPTION OF THE EMBODIMENTS

Referring now to drawings, various embodiments of the present invention will be described.

Figure 2:
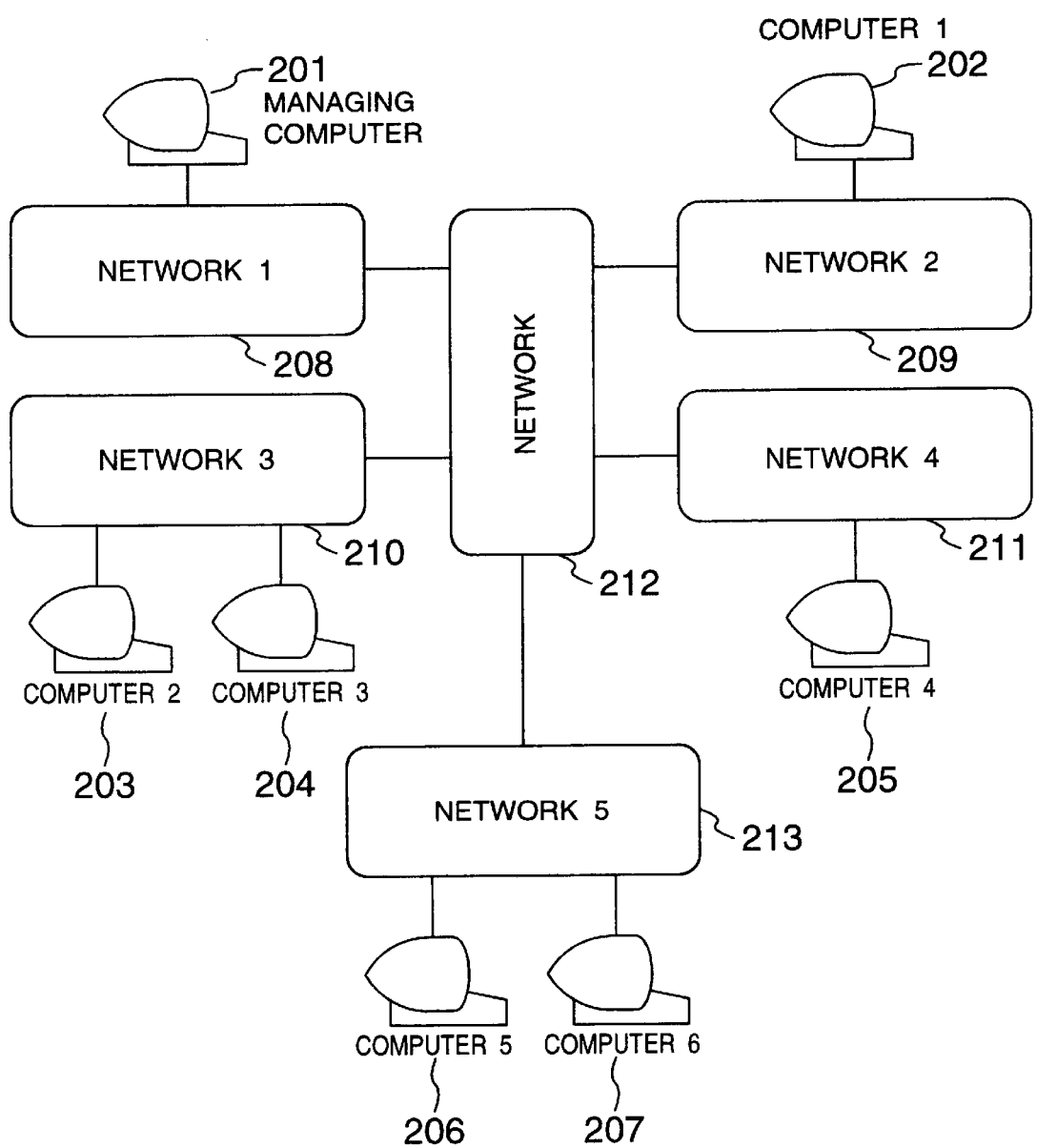
FIG. 2 schematically represents an entire structural diagram of a computer system according to an embodiment of the present invention.

In FIG. 2, there is shown an overall arrangement of a computer system according to this embodiment. A managing computer 201 is connected via networks 208 to 213 to computers 202 to 207 which are to be managed by the managing computer.

The computer system according to this embodiment allows the managing computer to collectively manage operation definition information, execution conditions, and execution results in combination with conditions of the computers themselves and the networks. In the operation definition information, execution schedules of operation processes are defined which should be executed by the computers 202 to 207. The execution conditions and the execution results are related to the computers 202 to 207.

Figure 1:
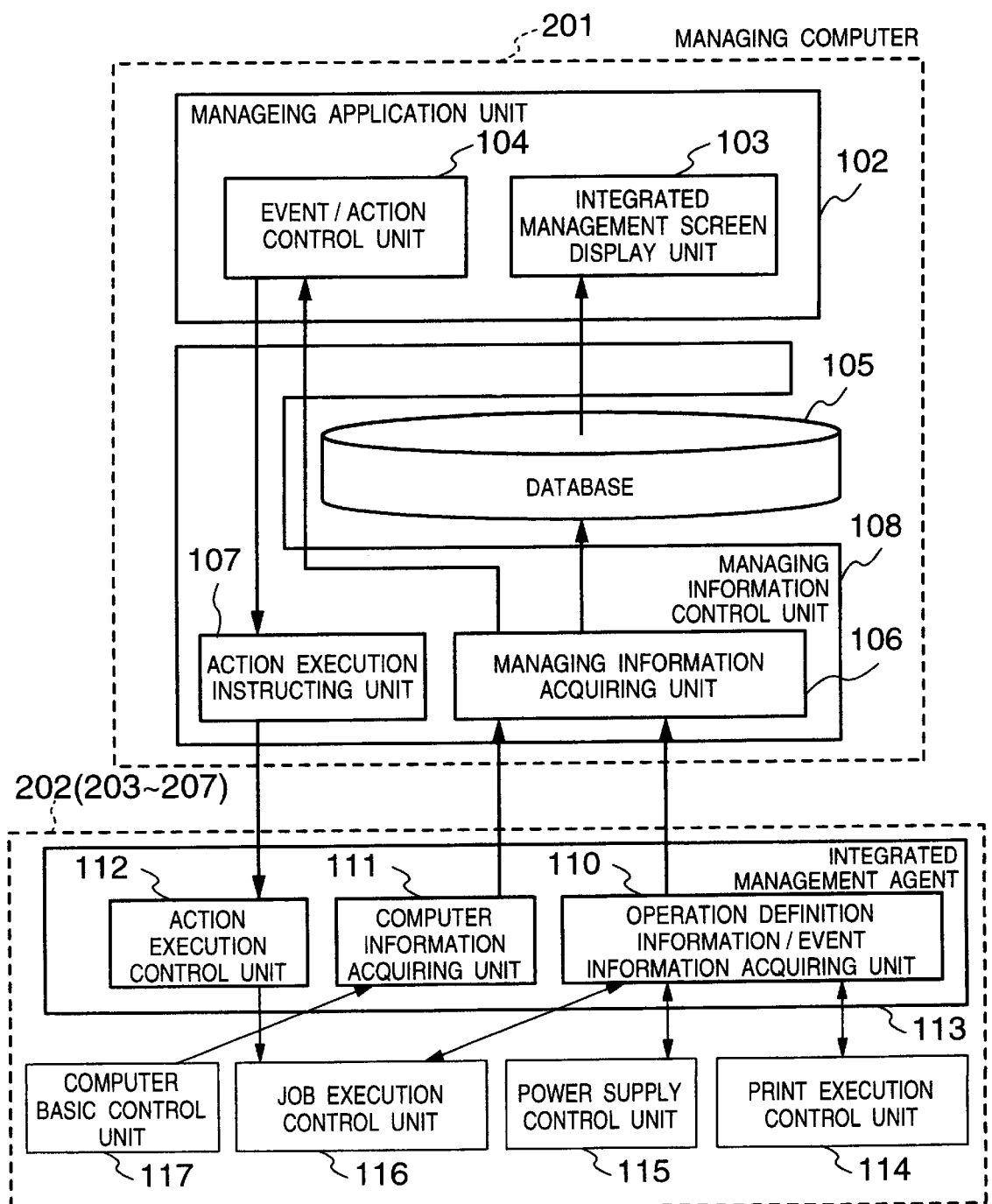
FIG. 1 is an explanatory diagram for explaining a system structure used to manage administration operations executed in the respective computers in an integrated manner by a managing computer.

FIG. 1 represents a system structure used to realize an integrated management of the computers 202 to 207 by the managing computer. It should be noted that although FIG. 1 indicates only the managing computer 201 and one computer 202, each of other computers 203 to 207 is similar to this computer 202.

As indicated in FIG. 1, the managing computer 201 includes a managing application unit 102, a database 105, and an managing information control unit 108.

The managing application unit 102 contains an integrated management screen display unit 103 and an event/action control unit 104. The integrated management screen display unit 103 displays and manages operation execution schedules, execution conditions, and events of the computers 202 to 207. The event/action control unit 104 executes a predesignated process with respect to a specific event received from the computer. The managing information control unit 108 contains a managing information acquiring unit 106 and an action execution instructing unit 107. The managing information acquiring unit 106 acquires the operation definition information and the event information from the computers 202 to 207. The action execution instruction unit 107 instructs a specific action with respect to the computers 202 to 207. The managing information acquiring unit 106 notifies the management information acquired from the computers 202–207 to the integrated management screen display unit 103, and further, if necessary, stores the management information into the database 105.

Also, each of the computers 202 to 207 is constituted by an operation execution portion and an integrated management agent 113. The operation execution portion executes an operation process defined by operation definition information about a computer basic control unit 117, a job execution control unit 116, a power supply control unit 115, a print execution control unit 114, and so on. The computer basic control unit 117 executes a basic control such as hardware and a process of a computer shown in FIG. 3.

The integrated management agent 113 is constructed of an operation definition information/event information acquiring unit 110, a computer information acquiring unit 111, and an action execution control unit 112. The operation definition information/event information acquiring unit 110 acquires present operation definition information and present event information from each of the operation execution portions. The computer information acquiring unit 111 acquires information relating to a utilization condition of hardware resources such as a CPU and a memory, and also to a utilization condition of software resources from the computer basic control unit 117. The action execution control unit 112 instructs an action execution received from the managing computer to the operation execution portions.

Figure 3:
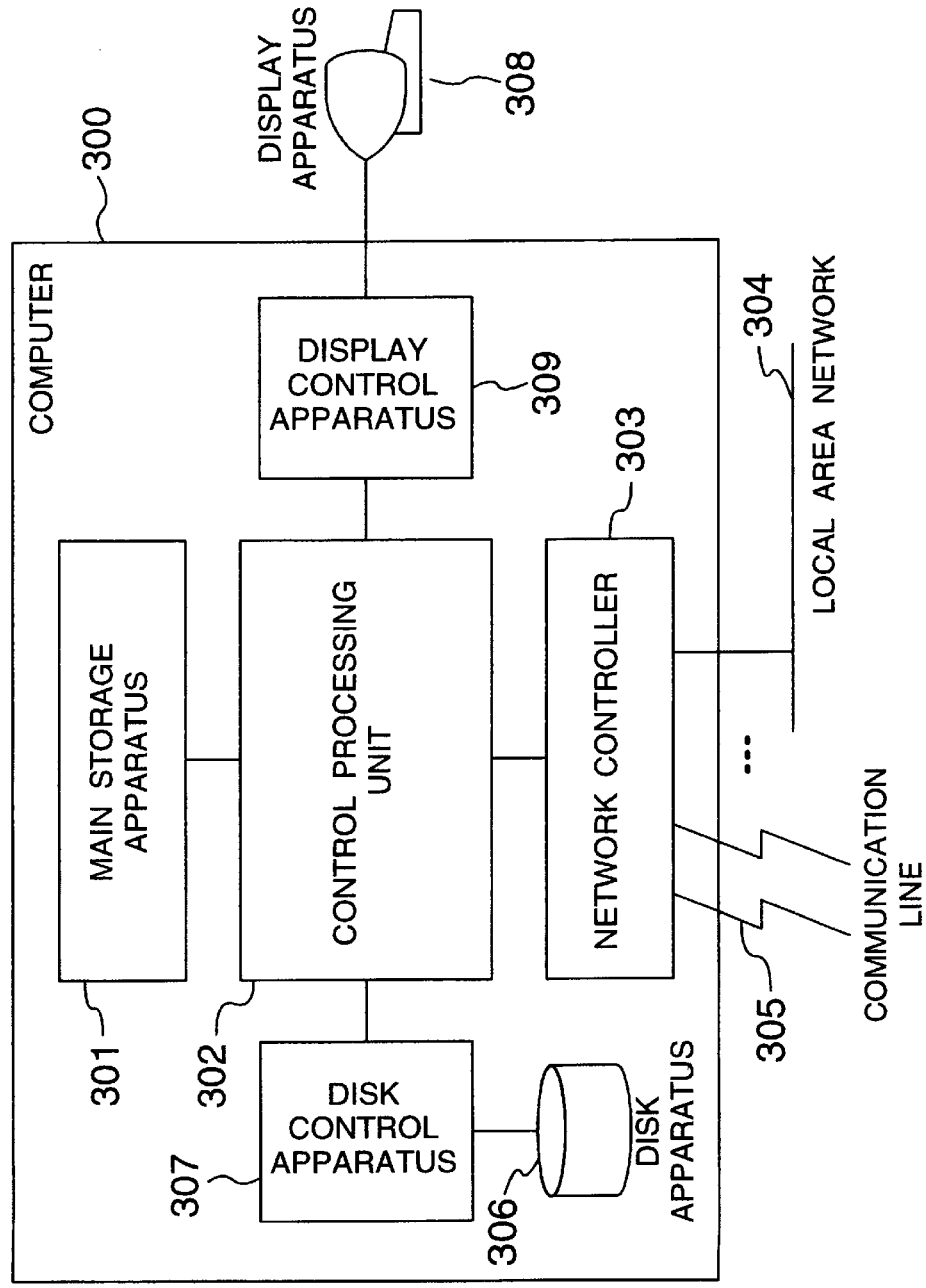
FIG. 3 schematically shows a hardware structural diagram of a managing computer and a computer.

In FIG. 3, there are shown a hardware structure of the managing computer 201 and a hardware structure of the computers 202 to 207.

As indicated in FIG. 3, each of the computers includes a central processing unit 302; a main storage apparatus 301; a network control apparatus 303 for controlling input/output of data between the own network control apparatus and a network such as a communication line 305 and a local area network 304; a disk apparatus 306; a disk control apparatus 307 for controlling input/output of the disk apparatus 306; a display apparatus 308; and a display control apparatus 309 for controlling input/output of the display apparatus 308.

Among the structural blocks of FIG. 1, the database 105 is realized-on the disk apparatus 307, whereas other structural blocks are realized by such a way that the central processing unit 302 loads a program stored on the disk apparatus 307 and then executes this program. It should be noted that this program is recorded on, for example, a recording medium such as a CD-ROM a floppy disk and a MO, is read by a driver (not shown), and is stored in the disk apparatus 307.

A description will now be made of a method for acquiring the managing information in the system arrangement of FIG. 1 as follows:

As to the operation definition information defined in the computer, and the event information for notifying that the operation is commenced and ended, and the failure happens to occur, such a method is conceivable to acquire these information at regular timing from the managing computer, or at timing when these information is required so as to display the managing information on the screen. Otherwise, another method is conceivable to initiatively notify these information by the computer to the managing computer at proper timing. Upon receipt of these information, the managing computer stores these information into the database, and displays such information having a high real-time characteristic on the integrated management screen display unit in accordance with a method (will be discussed later) shown in FIG. 4.

On the other hand, as to the structural information of the computer itself, the following methods are conceivable. That is, while computers to be managed are defined in the managing computer, detailed information is acquired via a computer information acquiring unit 111 from these computers. While an integrated managing agent is previously installed into the computers, the computer into which this program has been installed is searched by a method of a broadcast, and then detailed information is acquired via the computer information acquiring unit 111 from these computers.

Next, an example of an integrated management screen will now be explained with reference to FIG. 4, which is displayed by the integrated management screen display unit 103 owned by the managing application unit 102 in the managing computer 201.

As previously explained, in the managing computer 201, since the operation definition information, the event information, and the log information are stored into the database 105, the operation manager and the like utilize these information, so that the operation conditions of the computer system can be grasped. In other words, in the managing computer 101, such information which is requested to be referred to by the operation manager and the like is retrieved/referred to by the managing information control unit 108, and the integrated management screen display unit 103 owned by the managing application unit 102 produces an integrated management screen by using the retrieved/referred information. Then, the integrated management screen display unit 103 causes the display apparatus 308 to display thereon the produced integrated management screen. As a consequence, the operation manager and the like can grasp the operation conditions of the computer system by observing the integrated management screen displayed on the display apparatus 308.

Figure 4:
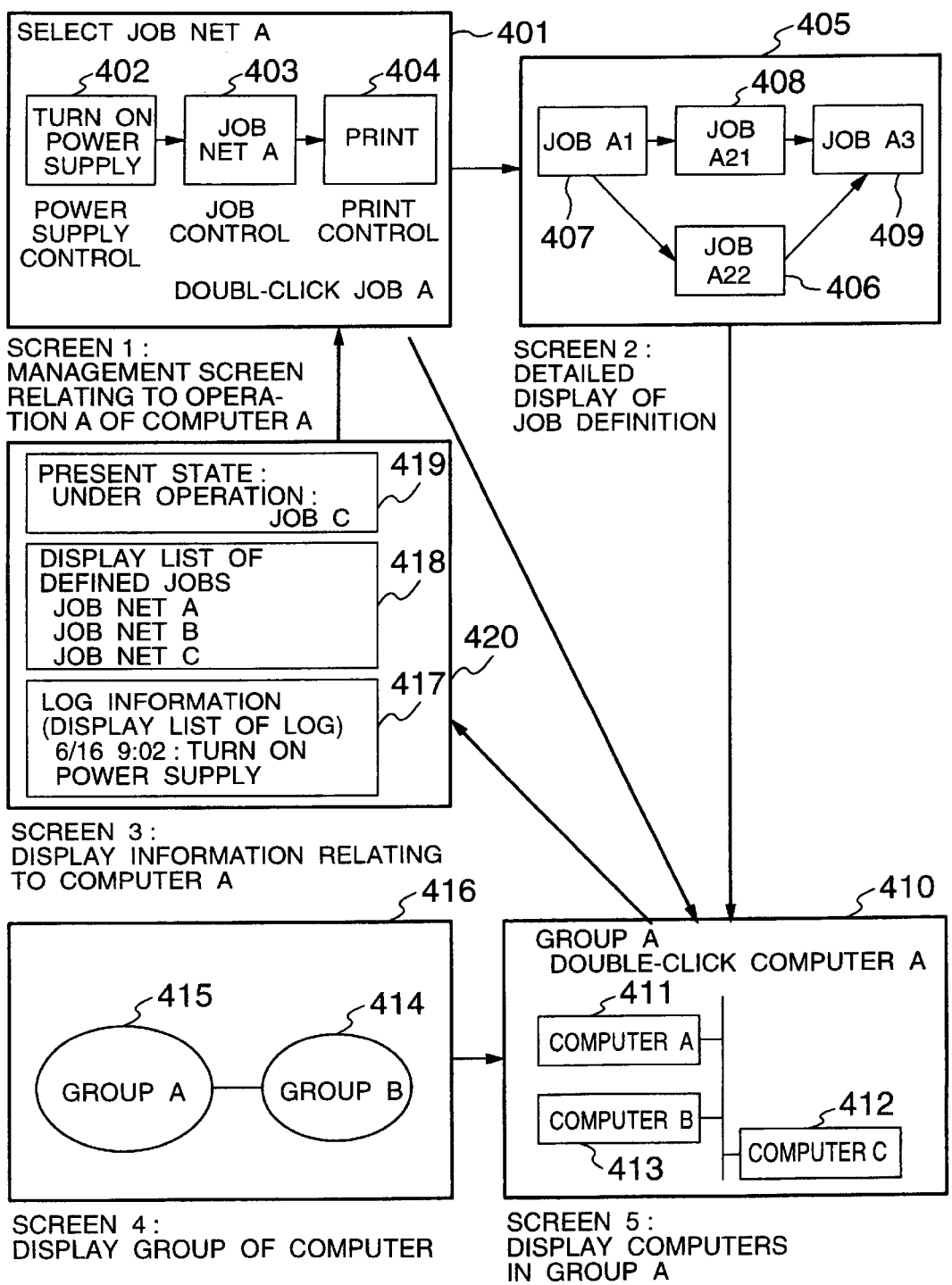
FIG. 4 is an explanatory diagram for explaining an example of an integrated management screen displayed in the managing computer.

In FIG. 4, a screen 1 (401) is an integrated management screen relating to "operation A" on "computer A". This screen 1 represents operation definition information which defines a series of operation processes such as "turn-ON of power supply (402)", "execution of job net A (403)", and "print of execution result "511"" as to "computer A". It should be noted that these operation processes 401 to 404 are indicated as icons, and various conditions such as "not yet executed" "under execution", "normal end of execution", or "abnormal end of execution" may be represented by changing the display modes (for example, change in color) of the respective icons. When the display modes of the respective icons are changed, the integrated management screen display unit 103 acquires latest event information at the timing of the corresponding operation processes 401 to 404 by the managing information acquiring unit 106.

For example, since the operation manager and the like double-clicks "job net A (403)" by way of a mouse in the screen 1 (401), the screen 1 (401) can be transient to another screen 2 (405).

In FIG. 4, a screen 2 (405) corresponds to a detailed integrated management screen concerning "job net A" on "computer A". In this screen 2 (405), the following definition is made that after an execution of "job A1 (407)" has been accomplished as to "job net A", both "job A21 (408)" and "job A22 (406)" are executed in a parallel manner, and at the time when the executions of both jobs are complete, "job A3 (409)" is executed. It should also be noted that these operation processes 406 to 409 are represented as icons, and various conditions such as "not yet executed" "under execution", "normal end of execution", or "abnormal end of execution" may be represented by changing the display modes (for example, change in color) of the respective icons. When the display modes of the respective icons are changed, the integrated management screen display unit 103 preferably acquires latest event information at the timing of the corresponding operation processes 406 to 409 by the managing information acquiring unit 106.

In FIG. 4, a screen 4 (416) corresponds to an integrated management screen used to confirm a group of the computers managed by the managing computer. In this case, both "group A(415)" and "group B(414)" are represented on this screen 4 (416). The respective groups are displayed as icons. The operation manager or the like double-clicks "group A" on the screen 4 (416) by using the mouse, so that this screen 4 (416) may be transient to a screen 5 (410).

In FIG. 4, a screen 5 (410) corresponds to an integrated management screen used to confirm the computers belonging to the group A on the screen 4. In this case, three sets of computers 411 to 413 are represented. These computers are represented as icons. Since the display modes of the respective icons are changed (for example, change in colors), various conditions such as "under initiation", "stop", or "partially stop" can be displayed. When the display modes of the respective icons are changed, the integrated management screen display unit 103 acquires latest event information at the timing of the corresponding computers 411 to 413 by the managing information acquiring unit 106. For instance, in the image 5, since the icon of "computer A(411)" is double-clicked by using the mouse, this screen 5 may be transient to the screen 3 (420).

In FIG. 4, a screen 3 (420) corresponds to an integrated management screen used to confirm an operation condition of "computer A". As to "computer A", an execution condition (419) of a present job, a list (418) of job nets whose executions are defined on "computer A", and a list (417) of log information equal to a past operation history are represented in the form of messages on this screen 3 (420). For example, since the operation manager and the like double-clicks a line related to "job net A" on the screen 3, the screen 3 (420) may be transient to the screen 1 (401).

Also, in either the screen 1 (401) or the screen 2 (405), since the operation manager and the like selects menu titled "computer structure display" (not shown), the screen 1 (401) may be transient to the screen 5 (410). At this time, on the display of the screen 5, the display method of "computer A" may be replaced by an enhancement display method in order to clarify a different from another computer.

FIG. 7A to FIG. 7D, and FIG. 8 indicate a method for managing on the database, configuration information of computers, operation definition information, information indicative of these conditions, and event information.

A computer management table 701 indicated in FIG. 7A stores thereinto managing information with respect to each of the computers in the order of definitions of the computers by the user (in the case that computers are manually defined), or in the order of discovery by the managing computer (in the case that computers are automatically discovered by managing computer). A single record is constituted by "computer group name", "computer name", "operation condition", "CPU utilization efficiency", and "detailed information". Among the above-described information, "operation condition" and "CPU utilization efficiency" are ones which are dynamically changed. It is possible to implement a method for acquiring these information at the time when the information is displayed on the integrated management screen display unit 103 in addition to the method for regularly acquiring these information by the managing computer. The acquisition may be realized in such a manner that the action execution control unit 112 of the integrated management agent 113 receives the information from the computer basic control unit 117. An operation definition table 702 corresponds to a table with respect to each of operation sorts other than a common table constituted by "identifier", "computer name", and "operation sort", and refers to operation definition detailed tables shown in FIG. 7C and FIG. 7D. In a table 703 relating to a power supply control shown in FIG. 7C, an operation definition detailed table is arranged by, for instance, "identifier", "power supply initiation (day)", "power supply initiation (time)", "power supply interrupt (day)", and "power supply interrupt (time)". In a table 704 relating to a job net indicated in FIG. 7D, an operation definition detailed table is arranged by, for example, "identifier", "job net name", "initiation day", "initiation time", and "configuration job definition". These operation definition information is acquired from the corresponding operation processes 114 to 116 via the operation definition information/event information acquiring unit 110 in the computer e.g. 202. The acquired information is converted into the table format of the above-described database 105 in the managing information acquiring unit 106 in the managing computer 201, and then the converted information is stored into the database 105. An event/log table 705 indicated in FIG. 8 is used to store thereinto the events and the log information acquired from the computer 202 by the managing computer 102 in a time sequence. A single record is arranged by "identifier", "computer name", "time", "event/log sort", and "detailed information". These record structures except for "detailed information" are made as a common format for all of the event logs. The above-described conversion into the format can be executed in the managing information acquiring unit 106 by the managing computer 201.

In the managing computer 201, the managing information control unit 108 retrieves the tables 701 to 705 shown in FIG. 7A to FIG. 7D, and FIG. 8 by using, for instance, a language of SQL and so on, so that the integrated management screen display unit 103 owned by the managing application unit 102 displays the monitor screen as shown in FIG. 4. In particular, as to a relationship between the operation definition information and the computer structural information, while this computer management table 701 is referred to from the computer name of the operation definition table 702 on the management screen 401, the configuration of the computers of the group to which this computer belongs can be displayed.

Also, on the management screen 410 of the computer, when the computer name is designated, while referring to the computer names of the operation definition table 702 and of the event/log table 705, the operation definitions and the execution conditions in this computer can be displayed (420, 401). When the screen is displayed, the managing computer 101 acquires the information required to be displayed at such a time instant when this information required to be displayed is not contained in the tables 701 to 705 shown in FIG. 7 and FIG. 8.

On the other hand, as to the event information, the managing computer 201 displays this event information on the monitor screen 308 immediately after the event information has been notified. A screen displayed by the managing computer 201 at this time is illustrated in, for example, FIG. 9.

FIG. 9 represents an example of a monitor screen on which event information of a computer A is displayed as a message among the notified event information. In this Figure, the message is constructed of an importance degree 801 of the event information, day/time 802 to 803 when the event is notified, a computer 804 of a notification source, and a message description 805. Furthermore, the message may be displayed in different colors, depending upon the importance degree.

As indicated in FIG. 9, the notified event information is outputted in a time series on the message display screen as shown in FIG. 9, but also is reflected on the display colors relevant to the management screen 401 and the computer management screen 410 in FIG. 4.

As will be discussed later, in addition, when a specific event occurs, a predesignated operation may be instructed to a computer to be managed. A specific explanation thereof will now be made with reference to FIG. 5 and FIG. 6.

Figure 5:
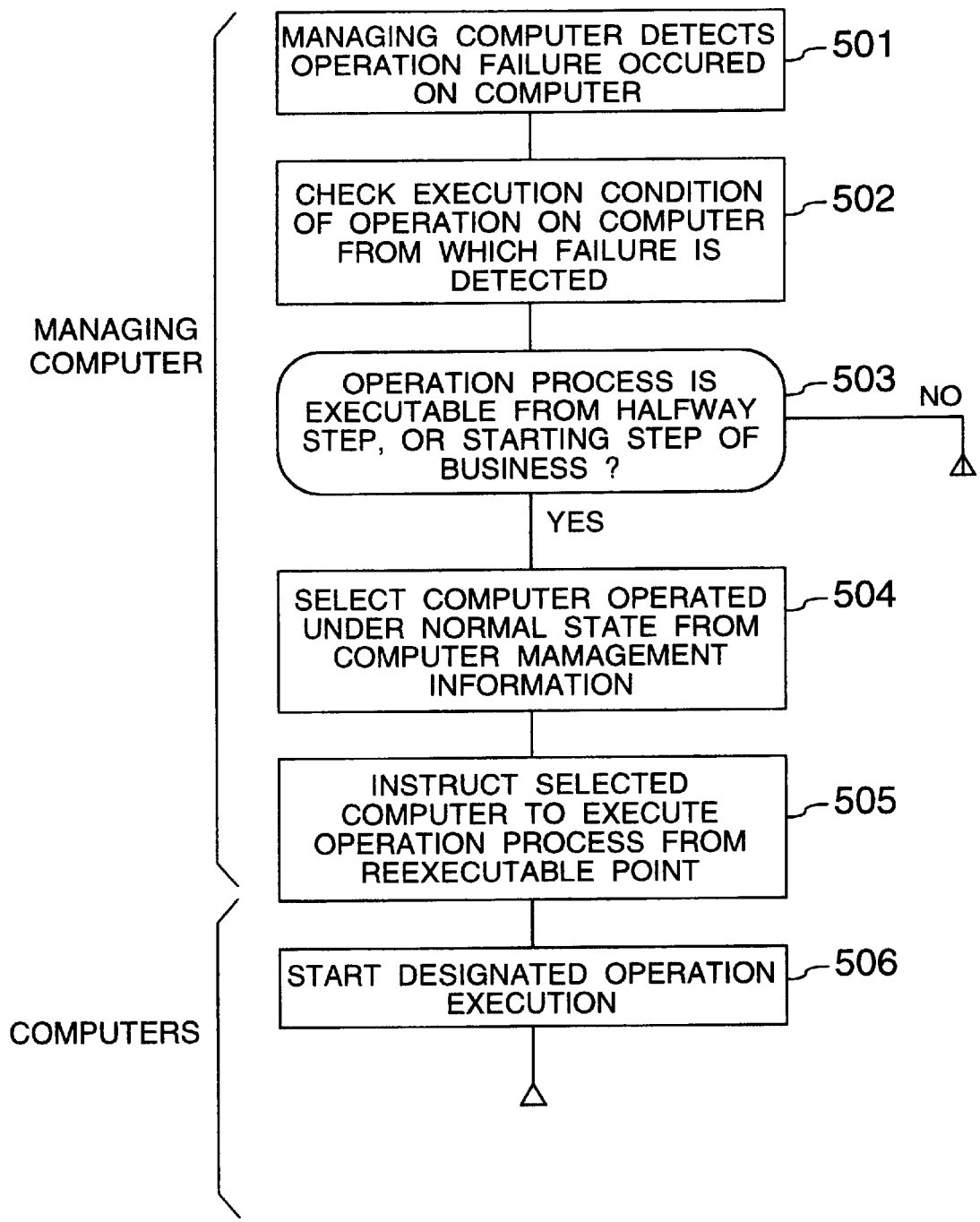
FIG. 5 is an explanatory diagram for representing a recovery sequence when a failure happens to occur in the computer.

Referring now to FIG. 5, a retry process operation executed when an abnormal operation is detected will be described.

In FIG. 5, when the managing computer 201 detects an abnormal operation process in the computer 202 based upon the table 704 (501), this managing computer 201 investigates operation execution conditions of the computer, the abnormal operation process of which is detected (502). This investigation is to judge as to whether or not a retry can be automatically executed. Furthermore, if the retry can be carried out, then the managing computer 201 judges a time instant when a certain operation process should be retried among a series of operation processes (503). A judgement whether or not this operation process can be automatically retried may be done as follows. That is, if a certain operation process among a series of operation processes is traced back, then the operation process can be automatically retried when the operation processes up to this traced time instant have been completed, and furthermore, no adverse influence is given to the subsequent operation processes only by utilizing the preceding results (in this case, the result is recorded on the non-volatile recording medium such as the disk apparatus 306; the above-described result information is transferred to another computer different from this computer; and the transferred information is required to be read during retry operation). Apparently, there is no problem when the operation processes have been accomplished up to this time instant, and furthermore the preceding results need not be used.

In addition, the judgement of the above-mentioned point which can be retried may be carried out as follows: That is, an application program itself outputs a specific end code at such a time instant when a specific process operation among a series of process operations is ended; the operation definition/event information acquiring unit 113 of the integrated management agent 110 notifies the event information added with the end code to the managing computer; the event action control unit 104 of the managing computer 201 refers to the above-mentioned event information stored in the database 105, so that the managing computer 201 can judge the retryable point based upon the above-mentioned event information. The specific end code outputted by the application program itself corresponds to "check point information" of an event log table shown in FIG. 10. When "check point information" indicates "OK", the end time instant of this job corresponds to the retryable check point, which indicates that a job subsequent to this job can be executed. It should be understood that as to the actual retry check point, the job may be retried from the immediately the latest "OK" by referring to the event/log information with respect to this job net.

Next, when the operation process can be automatically retried, a selection is made of such a computer which is operated under normal condition from the computer management information (504). An operation condition of a computer may be judged by referring to the computer management table 701 on the database of FIG. 7. With respect to the selected computer, an execution of a process operation is instructed from the retryable point (505). At this time, a program for executing an operation process is transferred to the above-mentioned computer, if required. Upon receipt of the above-mentioned instruction, the computer starts to execute the designated operation process (506).

Figure 6:
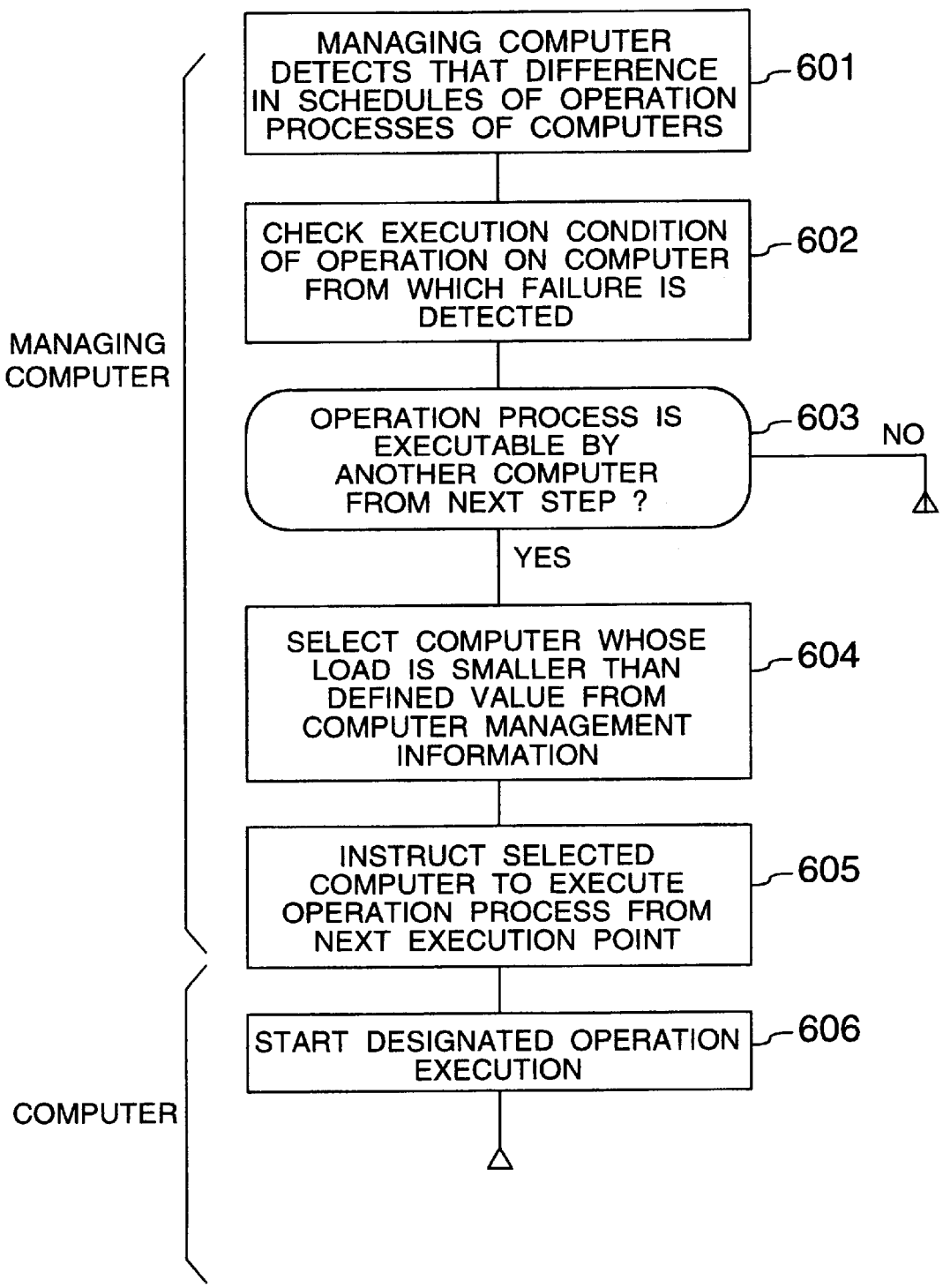
FIG. 6 is an explanatory diagram for showing a recovery sequence when a failure of a load is detected by the computer.

Next, a procedure when a termination time of an operation process becomes excessive will now be explained with reference to FIG. 6.

When the managing computer detects that a termination time of an operation process of a computer is increased larger than a definition value (601), this managing computer checks an execution condition of an operation on the computer from which the abnormal condition is detected (602). The judgement of delay is performed by calculating a difference between an initiation scheduled time instant and time instant information based on this initiation scheduled time instant described in the operation definition tables 702 to 704, and also the time instant information recorded on the event information such as the operation start/end notified from the computer to be managed. As one example for checking the operation execution condition on the computer from which the abnormal condition is detected, a judgement is made as to whether or not an ending point of the operation under execution may constitute such a point that the computer is switched. As a result, the computer may judge as to whether or not the time instant when this operation is ended corresponds to the retryable point, or as to whether or not such a judgement cannot be made at a starting time instant of each of the operations process. Then, this computer outputs this information to be added to an operation start event, and notifies the resultant information to the managing computer.

In the managing computer, a judgement is made of a retry possibility based upon the information notified from the computer to be managed (603). When the managing computer judges that the ending time instant of the present operation corresponds to the switching point, and when the operation under execution is terminated, the managing computer selects such a computer whose load value is not abnormal from the computer management table 701 (604), and then instructs the selected computer to execute the operation process (605). At this time, a program used to execute an operation process is transferred to the above-mentioned computer, if necessary. Upon receipt of the above-mentioned instruction, the computer to be managed starts to execute the designated operation process (606).

The effects and advantages achieved by the operation managing system according to the embodiment will now be described as follows:

As a first effect, the problems occurred in the operation can be readily solved. In accordance with the present invention, while the definitions, the execution conditions, and the execution results related to the operations are managed integrally mode, since the information about these definitions, execution conditions, and execution results are managed in connection with the arrangement and the conditions of the computer system, for example, when a failure happens to occur in a specific computer, such an operation influenced by this failure can be readily grasped. For instance, when a failure happens to occur in a specific computer, a display color of a symbol of this fail computer on a computer monitor screen is changed, and furthermore, a display color of an operation symbol under execution by a computer, displayed on the operation monitor screen, is changed; As a consequence, the problems occurred on the operation can be easily solved. In addition, while the execution conditions of the operation and the conditions/loads of the computer are managed in combination with the above aspects, when either the failure or the performance problem occurs, the operation processes can be automatically allocated in the dynamic manner to the computers operated under normal conditions.

As a second effect, a network traffic can be reduced. In accordance with the present invention, since the operation definition information, the event information, and the log information are stored in the database form by the managing computer 201, the managing computer 201 need not acquire the necessary information from the computer to be managed every time the operation manager and the like refer to these information, especially, such information whose change frequency is low.

For instance, in the network structure of FIG. 2, when a log message of 1K bytes per one message is acquired from each of the computers to be managed by the managing computer at a frequency of 1,000 messages/day, a network traffic of 6 M bytes/day is produced. When these log messages are directly acquired from the computers to be managed at a frequency of 10 times/day to be referred, a network traffic of 60 M bytes/day in total is produced. Also, as to detailed contents of execution results about such a log with a low demand of a real-time characteristic, if these detailed contents are scheduled so as to be collected within such a time range where the normal network traffic is low, for example, in a night time range, the network traffic reduction effect in a day time can be apparently achieved.

While the present invention has been described, in the computer system to which a plurality of computers are connected, the managing computer for managing these computers may manage the operations executed in the respective computers collectively, and further may perform the operations in a mutual relationship with the managements of the own computers. As a consequence, the problems can be readily solved without loading the managing computer.

What is claimed is:

1. In a computer operation management system in which a plurality of computers are connected via a network to a managing computer, said managing computer comprising:

means for managing a series of operations collectively said series of operations including an on-off operation of a power supply, a job performing operation, an execution result output operation and a designated operation to be performed when a specific event happens to occur with respect to the respective computers and combination thereof;

operation monitoring means for representing the respective operation performed on the computers by symbols, for representing an execution order of the respective operation by links with directions among the symbols, and further for representing execution conditions of the respective operation by colors of the symbols;

computer monitoring means for representing a connection relationship among the computers by links among symbols, and furthermore for representing operation conditions of the computers by colors of symbols; and means for mutually switching a monitor screen displayed by said operation monitoring means and a monitor screen displayed by said computer monitoring means to display the switched monitor screen, while making a relationship between the computers and the operation executed on the computers, and manifesting the relationship among the operation and the computers.

2. A computer operation managing system as claimed in claim 1, further comprising:

means for displaying the computer symbols of said computer monitoring means in a plurality of colors in accordance with conditions of the computers; and means for displaying the operation symbols of said operation monitoring means in a plurality of colors in accordance with conditions of the operation.

3. A computer operation managing system as claimed in claim 1, further comprising:

means for displaying thereon a message in which a change in the operation and the condition of the computer is notified as an event on the managing computer; and means for changing a display color of the message in accordance with an importance degree of the event.

4. A computer operation managing system as claimed in claim 1, further comprising:

means for instructing a previously designated computer to perform an operation of a previously designated operation when a specific event is received.

5. A computer operation managing system as claimed in claim 1, further comprising:

means for referring to conditions of the respective computers managed by said computer monitoring means when an operation cannot be completed under normal condition due to a cause of computers, or an application program, and for instructing the computers operated under normal condition to retry the operations by back tracking to a time instant when the operation can be retried.

6. A computer operation managing system as claimed in claim 5, further comprising:

means for regularly acquiring load conditions of the respective computers whose operation should be executed;

means for monitoring a time instant of an execution result with respect to a scheduled execution time instant of an operation; and means for interrupting the execution of operation on said computer at an execution point of a switchable operation when said execution result time instant executes a predesignated time range, and for instructing such a computer whose load is lower than a predetermined load to execute an operation from a next execution point.

7. A computer operation management method for a system in which a plurality of computers are connected via a network to a managing computer, comprising the steps:

managing a series of operations collectively said series of operations including an on-off operation of a power supply, a job performing operation, an execution result output operation and a designated operation to be performed when a specific event happens to occur with respect to the respective computers and combination thereof;

representing the respective operation performed on the computers by symbols, for representing an execution order of the respective operation by links with directions among the symbols, and further for representing execution conditions of the respective operation by colors of the symbols;

representing a connection relationship among the computers by links among symbols, and furthermore for representing operation conditions of the computers by colors of symbols; and mutually switching a monitor screen displayed by said operation monitoring means and a monitor screen displayed by said computer monitoring means to display the switched monitor screen, while making a relationship between the computers and the operation executed on the computers, and manifesting the relationship among the operation and the computers.

8. A computer program product comprising a computer readable storage medium having a program recorded thereon for implementing the operation of a computer operation management using a processor in a system in which a plurality of computers are connected via a network to a managing computer, said computer program comprising:

means enabling the processor to manage a series of operations collectively, said series of operations including an on-off operation of a power supply, a job performing operation, an execution result output operation and a designated operation to be performed when a specific event happens to occur with respect to the respective computers and combination thereof;

application monitoring means for enabling the processor to represent the respective operation performed on the computers by symbols, for representing an execution order of the respective applications by links with directions among the symbols, and further to represent execution conditions of the respective applications by colors of the symbols;

computer monitoring means for enabling the processor to represent a connection relationship among the computers by links among symbols, and furthermore to represent operation conditions of the computers by colors of symbols; and means for enabling the processor to mutually switch a monitor screen displayed by said operation monitoring means and a monitor screen displayed by said computer monitoring means to display the switched monitor screen, while making a relationship between the computers and the applications executed on the computers, and to manifest the relationship among the application and computers.

* * * * *